United States Patent [19]
Bullivant

[11] 3,868,643
[45] Feb. 25, 1975

[54] CONVEYOR MEMORY SYSTEM
[75] Inventor: Kenneth W. Bullivant, Turnersville, N.J.
[73] Assignee: K-Tron Corporation, Glassboro, N.J.
[22] Filed: Mar. 26, 1973
[21] Appl. No.: 345,039

[52] U.S. Cl. ................. 340/172.5, 222/55, 198/39, 235/151, 235/33, 214/11 C, 177/25, 177/119
[51] Int. Cl. ... G06f 15/20, B65g 43/00, G01g 19/00
[58] Field of Search ......... 340/172.5; 222/55, 55 X, 222/76, 76 X, 77, 77 X; 177/1, 16, 25, 119, 121, DIG. 1, DIG. 3, 165, 210; 235/151.33; 198/39; 214/11 R, 11 X, 11 C

[56] References Cited
UNITED STATES PATENTS

| | | | |
|---|---|---|---|
| 2,681,763 | 6/1954 | Saxe | 235/61 |
| 2,712,624 | 7/1955 | Beattie | 318/306 |
| 3,139,217 | 6/1964 | Mell | 222/57 |
| 3,155,277 | 11/1964 | Fath et al. | 222/55 |
| 3,375,357 | 3/1968 | Dekker et al. | 235/174 |
| 3,382,488 | 5/1968 | Graf | 340/172.5 |
| 3,390,731 | 7/1968 | Schierbeek | 177/16 |
| 3,478,830 | 11/1969 | Levesque et al. | 177/16 |
| 3,605,089 | 9/1971 | Gray | 340/172 S |
| 3,623,559 | 11/1971 | Folkes | 177/1 |
| 3,659,665 | 5/1972 | Godwin et al. | 177/1 |
| 3,665,169 | 5/1972 | Henderson et al. | 235/151.3 |
| 3,684,875 | 8/1972 | Smith et al. | 235/151.33 |
| 3,709,309 | 1/1973 | Williams | 177/165 |
| 3,714,401 | 1/1973 | Yano | 235/151.33 |
| 3,727,706 | 4/1973 | Streater | 177/1 |

*Primary Examiner*—Gareth D. Shaw
*Assistant Examiner*—James D. Thomas
*Attorney, Agent, or Firm*—Seidel, Gonda & Goldhammer

[57] ABSTRACT

A conveyor memory system stores signals representing the effects of the conveyor when unloaded in a memory. Each portion of the conveyor, which may be an endless belt, is assigned a particular address location in the memory. The effects of the unloaded conveyor belt, such as the weight at a particular weighing point, are stored in the memory at the address location corresponding to that particular portion of the belt. The stored signal representing the effect, such as weight, of the belt for that particular portion is read out of the memory as that particular portion passes the weighing point. The signal read out of the memory compensates for the effects of the unloaded conveyor, which may vary for each portion of the conveyor.

17 Claims, 8 Drawing Figures

CONVEYOR MEMORY SYSTEM

BACKGROUND OF THE INVENTION

This invention relates to a conveyor memory system. More particularly, this invention relates to a conveyor memory system in which signals representing the effects of the unloaded conveyor, as it passes a measuring point, are stored in a memory. The term "effects of the unloaded conveyor" means the physical effects of particular characteristics of the unloaded conveyor, such as weight or density, on a measuring device. When loaded, the conveyor transports material across a measuring point, and the stored signals are read out of the memory. Signals representing the effects of the loaded conveyor on the measuring device are offset by the stored signals, thereby compensating for the effects caused by the conveyor itself.

The present invention may be used to accurately compensate for variations in any conveyor system used to transport material through a measuring point. The present invention is particularly adapted to compensating for variations in conveyor belts. A conveyor belt has non-uniform characteristics of weight and density. This non-uniformity of characteristics of the conveyor belt is particularly important where measurements of the material transported by the conveyor belt are to be made with a high degree of accuracy and where a non-uniform characteristic of the conveyor belt introduces significant inaccuracies in those measurements.

For example, if the density of the material being transported by the conveyor belt were being measured by a radioactive detection method, the variations in the density of the belt may be a significant percentage of the density measured by the measuring device. Therefore, variations in the density of the conveyor belt due to variations in composition, moisture content, cleanliness and other factors would produce a significant error in the density measurement. This invention may be used to produce accurate density readings of each portion of the material being transported by the conveyor belt even though the density of the conveyor belt may vary from portion to portion. In addition, this invention may be used to compensate for variations in any other characteristic of the conveyor belt which may be relevant in other types of measurements.

This invention is particularly useful in compensating for variations in conveyor belts in continuous mass flow control systems such as the one described in United States patent application Ser. No. 169,398 filed Aug. 5, 1971 and entitled "Digital Mass Flow Control System" which is now U.S. Pat. No. 3,724,720. The invention of this patent was invented by the inventor herein and is assigned to the assignee of the present invention. The disclosure of that patent is expressly incorporated herein by reference.

In continuous weighing and control feeders such as the Digital Mass Flow Control System described in U.S. Pat. No. 3,724,720, the material, conveyor belt, and other mechanical components supporting the conveyor belt are continuously weighed and a weight signal is generated in response. This weight signal is multiplied with a signal representing the speed of the conveyor in order to obtain an indication of the mass flow. In such systems, an adjustment is made to compensate for the weight of the conveyor belt and other mechanical components supporting the conveyor belt. Such adjustment, however, compensates only for the average weight of the conveyor belt over the complete circuit of movement of the conveyor belt. However, the conveyor belt is normally non-uniform in weight due to variations in thickness, width, composition, cleanliness, belt wear and other imperfections in the belt such as gouges or creases caused by use. Since the weight of the conveyor belt is non-uniform over the length of the belt, the average tare adjustment would not be valid for belt travels of less than a complete circuit. In other words, although a tare adjustment of the nature available in the prior art may provide accurate measurements for an integral number of complete belt circuits, the measurements would not be accurate for a non-integral number of belt circuits; the tare adjustment, therefore, is not suitable for use where the mass flow must be accurately controlled at each instant such as in certain chemical manufacturing processes requiring the accurate control of adding chemicals to the process at each instant. In such processes, scrap may be produced, even though an exact amount of the chemical was added over the required time interval if there are wide variations in the amount delivered at each instant during the interval.

SUMMARY OF THE INVENTION

The present invention provides the significant advantage of being able to compensate for the exact characteristic of a conveyor system in any measuring, testing or weighing system in which the material being measured, tested or weighed is conveyed by the conveyor system.

The present invention is particularly advantageous for use in compensating for the varying weight effects at the load cell or weighing point in a continuous weighing system.

Briefly, in accordance with the present invention, apparatus is provided for compensating for the characteristics of the conveyor means at a predetermined measuring point, as the conveyor means traverses the measuring point. The effects of the characteristics of the conveyor means are completely eliminated from measurements made on any material present on the conveyor means. Means are provided to detect a predetermined point of the conveyor means and to generate a marker pulse in response to the detection of this point. Means are provided for generating travel pulses in response to the movement of the conveyor means. The marker pulses in conjunction with the travel pulses provide a means for identifying any portion of the conveyor means. A signal representing the effects of the characteristics of each portion of the conveyor means is stored in a memory at an address location determined by the marker and travel pulses. When measurements are being made of material transported by the conveyor means, the signal stored in the memory which represents the effects of the characteristics of the particular portion of the conveyor means then passing the measurement point is read out of the memory and used to compensate for the effects caused by the presence of the conveyor means itself.

In a preferred application of the present invention, the present invention is used to compensate for the variations in weight of an endless conveyor belt. These variations in weight may cause significant errors where the weight of the material being transported and weighed is small in comparison to the weight of the onveyor belt. In accordance with this preferred application, means are provided to detect a predetermined point of the conveyor belt and generate a marker pulse in response to the detection of that point upon each complete circuit of the conveyor belt. Means are provided for generating travel pulses in response to movement of the conveyor belt. The travel pulses identify the portion of the conveyor belt then passing through the measuring point. The weight of the unloaded conveyor belt is stored in a memory at address locations determined by the marker and travel pulses. When actual continuous weighing or controlled feeding of material is being performed, the stored signal representing the exact weight effects on the load cell of the portion of the conveyor belt at the weighing point is read out of the memory and used to compensate the weight signal due to the loaded belt.

BRIEF DESCRIPTION OF THE DRAWINGS

For the purpose of illustrating the invention, there are in the drawings forms which are presently preferred; it being understood, however, that this invention is not limited to the precise arrangements and instrumentalities shown.

DESCRIPTION OF THE PREFERRED EMBODIMENTS

Figures 1, 2, 3:
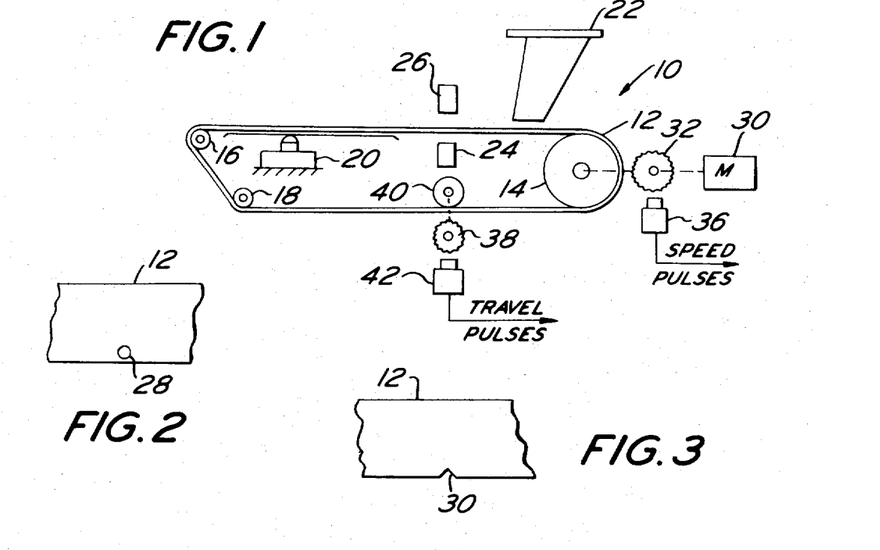
FIG. 1 is a schematic diagram of an endless conveyor belt feeder in accordance with the present invention.
FIGS. 2 and 3 are drawings of portions of conveyor belts used in indicating a predetermined point of the conveyor belts.

Referring now to FIG. 1 of the drawings, there is shown a schematic diagram of a feeder in which the present invention may be used. This feeder is designated generally by reference on pulleys 14, 16 and 18. A load cell 20 provides an output signal indicative of the weight of the conveyor belt including any weight which may be on the belt and any mechanical mounting structure. A hopper 22 is provided for depositing material onto conveyor belt 12. Suitable mechanical structure is shown in detail in U.S. Patent application Ser. No. 169,398 filed Aug. 5, 1971 entitled "Digital Mass Flow Control System," which is now U.S. Pat. No. 3,724,720.

Light source 24 and photodetector 26 detect a predetermined point on conveyor belt 12 for marking each complete circuit of conveyor belt movement. There is shown in FIG. 2 a hole 28 in conveyor belt 12. When hole 28 passes between light source 24 and the photodetector 26, a marker pulse is generated identifying this point of conveyor belt 12 and denoting one complete circuit of the belt. Alternatively, a notch 30 could be made in conveyor belt 12 as shown in FIG. 3 cause a marker pulse to be generated by photodetector 26 when it passes between light source 24 and photodetector 26. Although two different embodiments of means for detecting a predetermined point on conveyor belt 12 have been disclosed, it is apparent that various other means for detecting a predetermined point on the belts may be employed. Magnetic, mechanical, or even nuclear means may be employed to detect the predetermined point. For example, instead of hole 28 in FIG. 2, the area indicated at 28 could be a small deposit of magnetic or radioactive material which would be detected by a suitable detector. Furthermore, the hole 28 or a deposit of material at the location of hole 28 could be detected by a suitable mechanical arm such as the arm of a microswitch.

Referring now to FIG. 1, there is shown a motor 30 for driving pulley 14. Motor 30 may drive pulley 14 through a gear reduction drive and therefore the interconnection between motor 30 and pulley 14 is shown by dotted lines. A speed pick-up is provided on the output of motor 30 which is comprised of a gear 32 and a magnetic pick-up device 36. The output of magnetic pick-up device 36 is a series of pulses which are identified in FIG. 1 as speed pulses. Although the speed pick-up is illustrated as being magnetic, it is understood that various other types of pick-up devices, such as optical, may be used.

Gear wheel 38 may be mechanically connected to an idler roller 40, as shown, or it may be connected to one of the pulleys 16 or 18. The rotation of gear wheel 38 is detected by magnetic pick-up device 42. The output of magnetic pick-up device 42 is a series of pulses identified in FIG. 1 as travel pulses which indicate increments of movement of belt 12. The travel pulses identify the portion of the belt then at the weighing point. Any suitable means for detecting the movement of belt 12 may be used, such as optical, mechanical, or even nuclear means.

Figure 4:
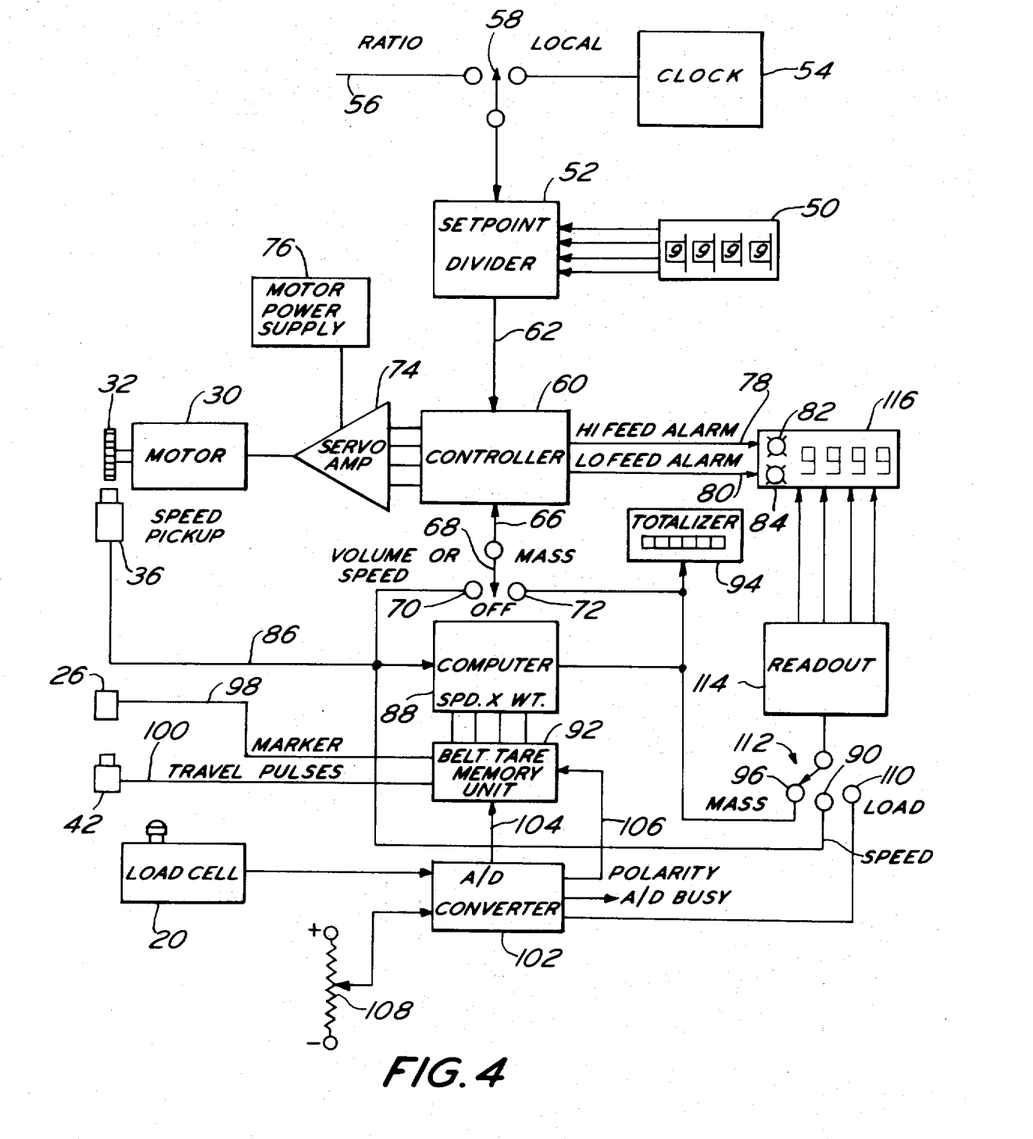
FIG. 4 is a block diagram of a digital feeder incorporating the present invention.

Referring now to FIG. 4, there is shown in block diagram a system incorporating a belt tare memory unit 92 in accordance with the present invention. There is shown set point thumb wheel switches 50 for setting the desired set point speed or mass flow rate for the feeder 10. Set point thumb wheel switches 50 control set point divider 52 which may be a binary rate multiplier. The functional relationship between thumb wheel switches 50 and the other elements of the system shown in FIG. 4 is described in detail at column 5, lines 1–33 of my U.S. Pat. No. 3,724,720, expressly incorporated hereby reference. Set point divider 52 receives an input pulse train from either clock 54 or from a remote pulse train source (not shown) via input line 56 depending upon the position of switch 58. A pulse train is provided on input line 56 from a remote pulse train source when a number of feeders are to be operated at a rate which is a constant relative to the rate of other feeders. This is referred to as the ratio mode.

The output of set point divider 52 is a set point pulse train having a pulse repetition rate which is proportional to the setting on set point thumb wheel switches 50. The output of set point divider 52 is applied to controller 60 via line 62. The functional relationship between controller 60 and the other elements shown in FIG. 4 is described in detail at column 5, lines 34–50 and 66–67, column 6, lines 1-end, and column 7, lines 1–12 of my U.S. Pat. No. 3,724,720, expressly incorporated herein by reference. A second input via line 66 is applied to controller 60. This second input is a pulse train having a pulse repetition rate which is proportional to the speed of motor 30 when switch 68 is in contact with terminal 70. The pulse train on line 66 has a pulse repetition rate proportional to the speed of motor 30 multiplied by the belt loading when switch 68 is in contact with terminal 72.

Controller 60 controls servo amplifier 74 in response to the inputs on line 62 and 66. Control of Servo amplifier 74 by controller 60 is described in detail at column 5, lines 55-65 of my U.S. Pat. No. 3,724,720, expressly incorporated herein by reference. Servo amplifier 74 receives electrical power from motor power supply 76 and drives motor 30. Basically, controller 60 cancels a set point pulse on line 62 for each input pulse received on line 66 and vice versa. If more pulses appear instanteously on either line 62 or line 66, these pulses are stored in a memory until they are cancelled. If the capacity of the memory is exceeded by either an excess of set point pulses on line 62 or pulses on line 66, lamp 82 or 84 is energized via an alarm signal on lines 78 or 80.

Magnetic pickup device 36 provides a pulse train on line 86 having a pulse repetition rate proportional to the speed of motor 30. This pulse train is applied to terminal 70 of switch 68, the input to computer 88 and to terminal 90. The computer 88 may be a binary rate multiplier. The operation of Computer 88 and, in particular, a rate multiplifier is described in detail at column 3, lines 33-end, and column 4, lines 1-46 of my U.S. Pat. No. 3,724,720, expressly incorporated herein by reference Computer 88 multiplies the pulse train input on line 86 with a binary signal output of belt tare memory unit 92 which is proportional to the weight output signal of load cell 20 less the instantaneous effects of the conveyor belt and any other mechanical components operating on the load cell 20. The output of computer 88 is a pulse train signal proportional to the speed of the conveyor belt multiplied by the weight. In other words, the output of computer 88 is a pulse train signal having a pulse repetition rate proportional to the mass being transported by the conveyor belt. The output of computer 88 is applied to terminal 72 of switch 68, totalizer 94 and terminal 96.

Belt tare memory unit 92 receives a marker pulse input from photodetector 26 via line 98, travel pulses from magnetic pickup device 42 via line 100, weight or load pulses from analog to digital converter 102 via line 104 and a polarity input from analog to digital converter 102 via line 106. Analog to digital converter 102 receives an analog signal from load cell 20 which is proportional to the weight applied to load cell 20. The analog signal output of load cell 20 has a magnitude, at any particular instant of time, proportional to the instantaneous weight applied to load cell 20. This instantaneous effect of the loaded conveyor belt 12 on load cell 20 is the sum of the load on the conveyor belt, the loading effect of the conveyor belt itself and the effect of any mechanical components. Tare control 108 provides an average adjustment to compensate for the tare effects. However, tare control 108 cannot provide a varying adjustment to compensate for the varying effects of the conveyor belt as it completes a circuit of travel.

Figure 5:
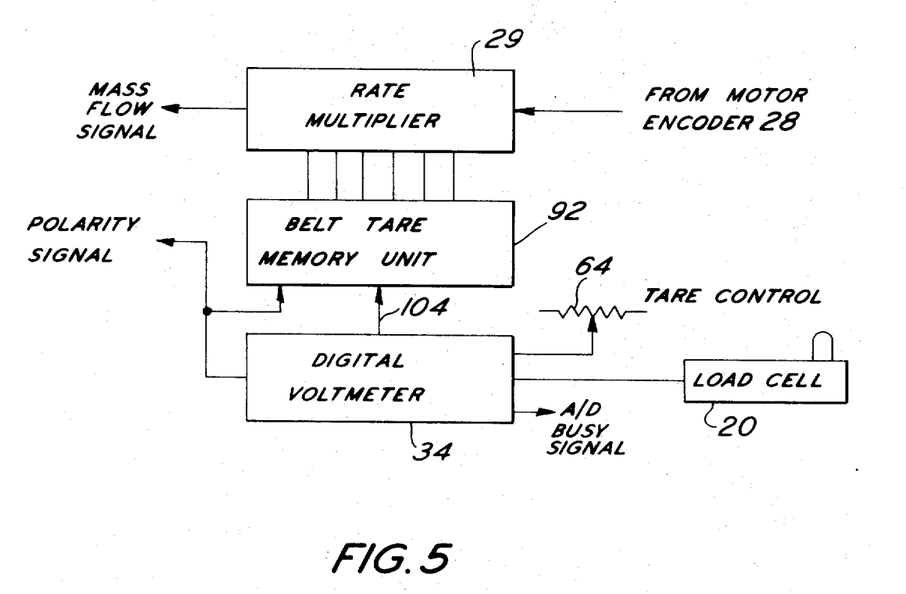
FIG. 5 is a block diagram indicating the interconnection of the present invention in a particular prior art digital feeder.

Analog to digital converter 102 provides a polarity signal, via line 106 to belt tare memory unit 92, and an instantaneous load or weight signal to terminal 110. Switch 112 is used to select either the instantaneous mass, speed or load signal and apply it to readout unit 114. Readout unit 114 converts the pulse train signal selected by switch 112 to a binary coded decimal form and applies it to numeric readout 116 as described at column 9, lines 19-32 of my U.S. Pat. No. 3,724,720, expressly incorporated herein by reference FIG. 5 shows belt tare memory unit 92 connected into the circuitry disclosed in United States patent application Ser. No. 169,398 filed Aug. 5, 1971, entitled "Digital Mass Flow Control System", which is now U.S. Pat. No. 3,724,720. Belt tare memory unit 92 receives a pulse train input via line 104 from digital voltmeter 34 in response to load cell 20 may provide a parallel digital coded signal output or a series pulse train output. As shown in FIG. by line 104, the serial pulse train output is used as the input to belt tare memory unit 92.

Figure 6:
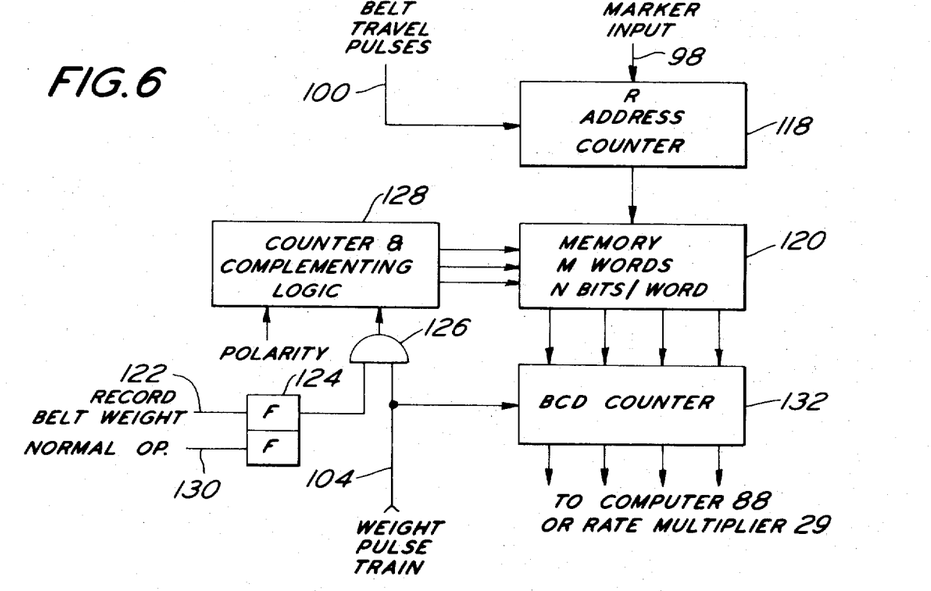
FIG. 6 is a schematic diagram, partially in block diagram form, of a conveyor memory system in accordance with the present invention.

Referring now to FIG. 6, there is shown in greater detail one embodiment of belt tare memory unit 92. As conveyor belt 12 travels completing its circuit, a marker input pulse is generated on line 98 by photodetector 26 for each complete circuit of travel and a predetermined number of belt travel pulses corresponding to the number of segments of belt 12 to be meausred, are generated on line 100 by magnetic pickup device 42. By way of specific example, but not limitation, 62 belt travel pulses may be generated for each complete circuit of travel of conveyor belt 12. The belt travel pulses on line 100 are counted by address counter 118. Address counter 118 is reset by the marker input pulse on line 98 upon each complete circuit of travel of conveyor belt 12. The count in address counter 118 addresses a particular memory location in memory 120 corresponding to each segment of belt 12.

In order to initially record the effects of the conveyor belt and mechanical components on load cell 20, a record belt weight signal is generated on line 122 which sets flip-flop 124. The record belt weight signal may be generated by the depressing of a switch or any other suitable means. The setting of flip-flop 124 enables AND-gate 126.

The record belt weight signal is generated only when it is desired to calibrate the system. The conveyor belt would be empty at this time. The weight effects of the conveyor belt, as described herein, cover any variations of force on load cell 20. For example, the weight of the conveyor belt at several adjacent belt segments may not vary but load cell 20 may still detect a variation due to a crease, crinkle, notch or other imperfection in the belt. Therefore, the exact effects of the characteristics of an empty conveyor belt on load cell 20 may be recorded and then subtracted from the weight detected by load cell 20 when the belt is loaded.

During calibration, with flip-flop 124 and AND gate 126 enabled by the record belt weight signal, the weight pulse train on line 104 corresponding to a particular segment of belt 12, is gated into counter and complementing logic unit 128. Counter and complementing logic unity 128 may consist of any suitable well known and commercially available circuitry which functions as a counter and then complements the count contained in the counter. This complement count from counter and complementing logic unit 128 is stored in memory unit 120 at the particular address determined by the marker input on line 98 and the belt travel pulses on line 100.

In shifting to normal operation, a signal is generated on line 130 by a switch or other suitable means which resets flip-flop 124. The resetting of flip-flop 124 disables AND gate 126.

In normal operation, as each new address in memory 120 is addressed by counter 118, the complemented count at that address is read out and set into binary coded decimal counter 132. This presents binary coded decimal counter 132 to the complemented count, which represents the weight effects corresponding to the segment of conveyor belt 12 being meausred. The weight pulse train on line 104 is then fed into binary coded decimal counter 132 which counts up starting from the present complemented count.

As a specific example of this operation, assume that the belt and mechanical components have an effect of four units on load cell 20 at address location 1 which corresponds to a segment of conveyor belt 12 immediately following the location of hole 28 or other suitable marker on the belt. Since these four units were counted and complemented in counter and complementing logic unit 128, the complement of four or for a four-digit number, that is, 9996, stored in memory unit 120. During the normal operation, the number 9996 would be shifted into binary coded decimal counter 132 prior to the receiving of the weight pulse train when the conveyor belt is at the location having an assigned address of 1. Assuming that the material on the conveyor belt has a weight of 100 units, the effect on load cell 20 would be 104 units due to the weight effect of the belt and mechanical components. Therefore, binary coded decimal counter 132 would be counted up 104 units from the preset count of 9996. The output of binary coded decimal counter 132 at the end of the count of the weight pulse train would therefore be 100. This corresponds to the actual weight of the material at this segment of belt 12 and the weight effects of the belt and mechanical components are thus accurately compensated for at the exact instant that the weight measurement was made.

Figure 7:
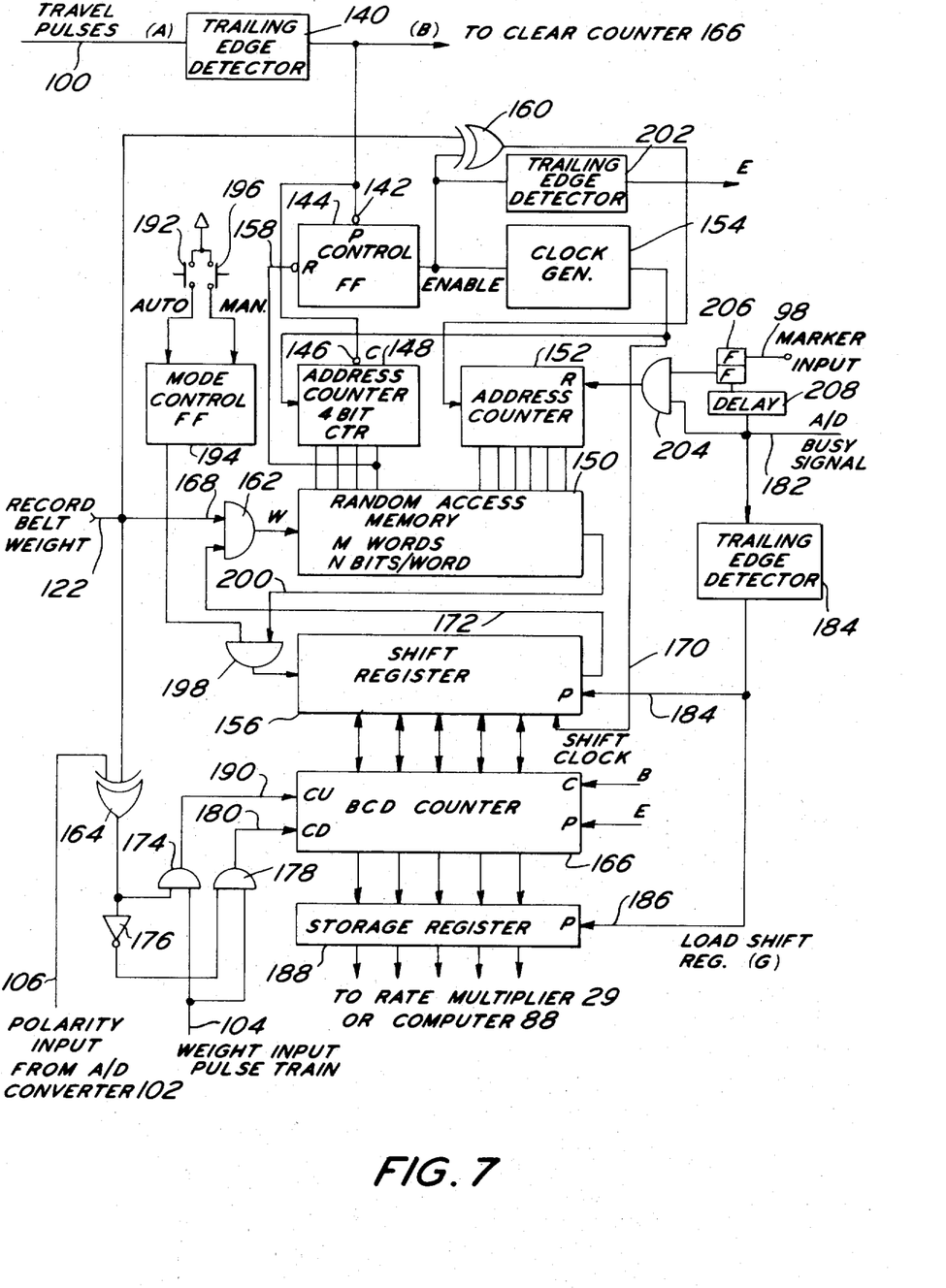
FIG. 7 is a schematic diagram, partially in block diagram form, of another embodiment of a conveyor memory system in accordance with the present invention.
Figure 8:
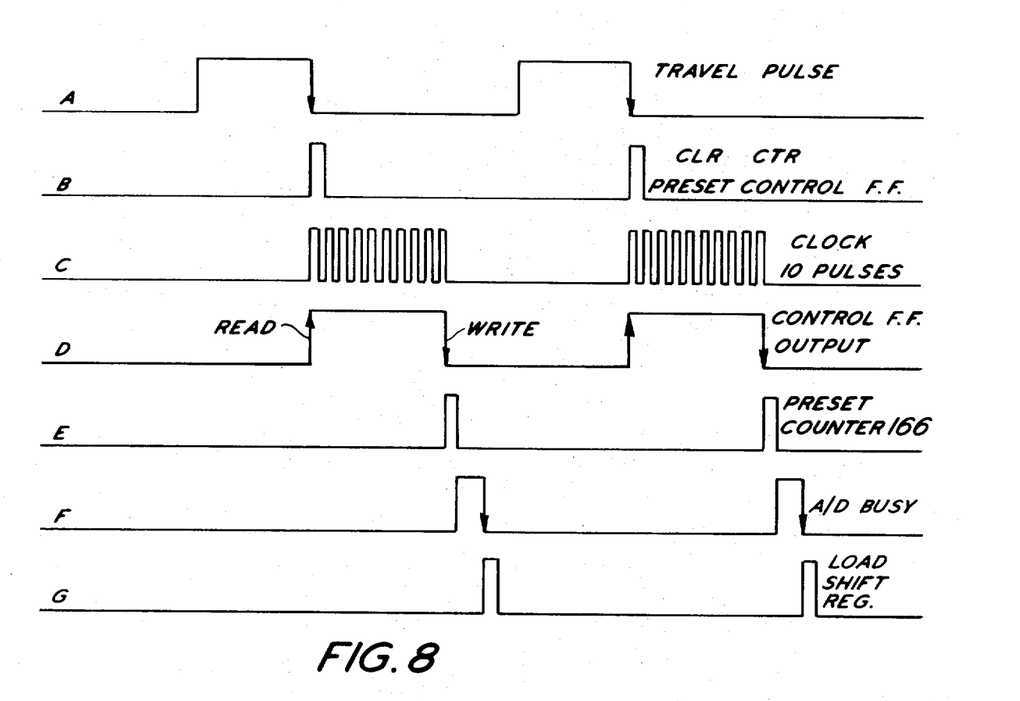
FIG. 8 is a drawing of electrical wave shapes generated in circuitry built in accordance with FIG. 7.

Referring now to FIG. 7, there is shown a schematic diagram, partially in block diagram form, of another embodiment of the present invention which uses a memory capable of storing M words with N bits per word. FIG. 8 is a drawing of waveforms which occur in the operation of a circuit in accordance with FIG. 7.

In FIG. 7, travel pulses, as shown at A in FIG. 8, on line 100, are applied at the input to trailing edge detector 140. Trailing edge detector 140 may be any suitable circuit or device which generates a pulse in response to the trailing edge of an input pulse. In the particular example being illustrated, positive pulses are used. Therefore, trailing edge detector 140 may be a differentiating circuit having a diode poled to short circuit the spike generated on the leading edge.

The output pulse of trailing edge detector 140 is shown at B in FIG. 8. This output pulse of trailing edge detector 140 is applied to the preset input 142 of control flip-flop 144 and to the clear or reset input 146 of address counter 148.

In the specific example being illustrated, by way of example, but not limitation, the conveyor belt 12 may be divided up into 62 predetermined areas each having a predetermined address and, therefore, the number of words, M, is 62. Assume the word to be stored in an address comprises 10 bits of information, that is, assume that N equals 10. This information is stored in random access memory 150. The location of the 10 bits of information is addressed by address counter 152 and the ten bits of information are then stepped through in sequence by four bit counter 148.

Although it is convenient to refer to the conveyor belt 12 as being divided into 62 distinct area, it is understood that the effect of the conveyor belt on load cell 20 when a particular area of the conveyor belt is actually over the load cell is in part due to the effect of the whole conveyor belt. For example, a crease in the conveyor belt at a portion of the belt which is over one of the pulleys may affect the weight signal output of load cell 20 even though the creased portion of the belt is not presently over load cell 20. Actually, the weight of conveyor belt 12 stored in memory 150 is the tare effect of the conveyor belt and any mechanical components on load cell 20 as the conveyor belt completes its cycle of travel.

The output of control flip-flop 144 is applied as an enabling signal to clock generator 154. Clock generator 154 provides input pulses to address counter 148 and shifts pulses to shift register 156. Upon address counter 148 counting up to 10, control flip-flop 144 is reset via line 158.

The output of control flip-flop 144 is also applied to one input of exclusive OR gate 160. The other input to exclusive OR gate 160 is the record belt weight signal from line 122. Exclusive OR gate 160 causes address counter 152 to be stepped on the leading edge of the output of control flip-flop 144 when a record belt weight signal is not present on line 122. If the record belt weight signal is present on line 122, address counter 152 is stepped on the trailing edge of the output of control flip-flop 144 as shown at D in FIG. 8.

The record belt weight signal on line 122 is also applied to AND gate 162 and exclusive OR gate 164. AND gate 162 controls the function of writing into memory 150. Exclusive OR gate 164 controls the function of complementing or not complementing the count of the weight input pulse train on line 104 as it is counted by counter 166.

When a record belt weight signal is present on line 122 and therefore present on input 168 of AND gate 162, data serially shifted out of shift register 156 by shift clock pulses on line 170 from clock generator 154 are written or stored in random access memory 150 via line 172 and AND gate 162.

The polarity input from analog to digital converter 102 is applied to one input of exclusive OR gate 164. The other input to exclusive OR gate 164 is the record belt weight signal. Assuming the polarity input from analog to digital converter 102 indicates that the pulse train weight input is the positive weight input signal and there is no record belt weight input signal present on line 122, the pulse train weight input signal on line 104 will be applied to the count-up input via AND gate 174. Inverting amplifier 176 causes AND gate 178 to be disabled thereby blocking the weight input signal on line 104 from reaching the count-down input of counter 166.

Assuming that the polarity input from analog to digital converter 102 indicates a positive weight output signal and that a record belt weight signal is present on line 122, the output of exclusive OR gate 164 will cause AND gate 174 to be disabled. The inversion of the output of exclusive OR gate 164 by inverting amplifier 176 will cause AND gate 178 to be enabled. Therefore, the pulse train input on line 104 will be applied to the countdown input of counter 166.

The output of converter 102 may be a positive or negative weight signal reading for tare control 108 set at the average tare value for a complete circuit of travel of an empty belt 12. In other words, the instantaneous tare effects will vary about a zero level set by tare control 108. Also, it is possible to create a negative weight output signal from converter 102 by tare control 108 in FIG. 4 being set improperly. However, a negative effective weight will be automatically compensated for by the polarity input on line 106. However, for the purposes of further explanation, a positive weight will be assumed.

When a record belt weight signal is present on line 122, the weight input pulse train is applied to the countdown input 180 of binary coded decimal up/down counter 166. As discussed above the belt weight signal is present on line 122 whenever a switch or other suitable means is operated to calibrate the system by recording the weight effect of the belt in an unloaded condition. Since the input pulse train on countdown input 180 causes counter 166 to count down, the count in counter 166 is the complement of the count of the number of pulses appearing on countdown input 180. It is noted that counter 166 is reset to zero at the trailing edge of the travel pulse by the output of the trailing edge detector 140. This signal is shown at B in FIG. 8.

The count in counter 166 is preset into shift register 156 after the completion of the analog to digital conversion of the load cell output by analog to digital converter 102. During the conversion from analog to digital by analog to digital converter 102, an A/D busy signal is generated on line 182. This A/D busy signal is shown at F in FIG. 8. The A/D busy signal on line 182 is applied to trailing edge detector 184. Trailing edge detector 184 generates a pulse output on the trailing edge of the A/D busy signal as shown at G in FIG. 8. Trailing edge detector 184 may be the same as trailing edge detector 140 discussed previously. The output pulse of trailing edge detector 184 is applied to preset input 184 of shift register 156 and to preset input 186 of storage register 188.

The pulse on preset input 185 of shift register 156 presets or loads the count in counter 166 into shift register 156. As discussed previously, the count in counter 166 was the complement of the count of the number of pulses on countdown input 180.

As discussed previously, AND gate 162 is enabled by the record belt weight signal on line 122. Therefore, the output pulses of clock generator 154, as shown at C in FIG. 8, shift the count serially out of shift register 156 via line 172 and AND gate 162 into memory 150 as address counter 148 addresses the ten bit positions for the address determined by address counter 152. Therefore, the complement of the weight effect on load cell 120 for the particular address location of a particular portion of the belt is stored at the proper address in memory 150.

In the normal operating mode, that is, after the system has been calibrated or, in other words, the effects of an empty belt stored in memory in complement form, the record belt weight signal is not present on line 122. The weight input pulse train on line 102 is applied via AND gate 174 to count up input 190 of counter 166. However, prior to counter 166 being counted up, counter 166 is cleared or reset by the output of trailing edge detector 140 at the trailing edge of the travel pulse as shown at (B) in FIG. 8, the complemented count stored in memory 150 is read out from shift register 156 by the clock pulses shown at (C) in FIG. 8, and this count in shift register 156 is preset into counter 166. Therefore, the pulses on count up input 190 of counter 166 start at this preset count, count up to zero, and then count up to the actual load present on conveyor belt 12.

Describing normal operation in greater detail, it is assumed that pushbutton switch 192 has been depressed setting mode control flip-flop 194. In order to reset mode control flip-flop 194, switch 196 would be depressed. Switches 192 and 196 may be any type of suitable pushbutton switch. Such switches are well known and commercially available. Furthermore, a single pole double throw switch may be substituted for these switches. The depressing of switch 192 sets the system into automatic mode, the normal operating mode. Depressing switch 196 disables the memory unit of the present invention. In the manual mode of operation, only an average tare adjustment would be made, via tare control 108 as shown in FIG. 4.

With mode control flip-flop 194 set, AND gate 198 is enabled. Therefore, data is read out of random access memory 150 via line 200 and is entered into shift register 156. Briefly, in normal operation, travel pulses, as shown at A in FIG. 8, appear on line 100. The output of trailing edge detector 140 as shown at B in FIG. 8 causes control flip-flop 144 to be preset and address counter 148 to be cleared. Presetting of control flip-flop 144 enables clock generator 154 and the leading edge of the output of control flip-flop 144 steps address counter 152 via exclusive OR gate 160 since a record belt weight signal is not present on line 122.

Clock generator 154 generates clock pulses as shown at C in FIG. 8. These clock pulses are counted by address counter 148 which steps through the ten bits stored an address of memory 150. The clock pulse output of clock generator 154 is also applied to the shift input of shift register 156 via line 170. Therefore, address counters 148 and 152 read out the data stored in memory 150. This data read out of memory 150 is serially shifted into shift register 156 via line 200 and AND gate 198. AND gate 198 was enabled by mode control flip-flop 194 being set in the automatic mode.

The data stored in shift register 156 is then preset into counter 166 by the trailing edge of the output of control flip-flop 144, as shown at D in FIG. 8. As discussed above, control flip-flop 144 is reset when address counter 148 reaches the count of 10. The pulse preseting the count contained in shift register 156 into counter 166 is generated by trailing edge detector 202 which may be the same as trailing edge detector 140. The signal output of trailing edge detector 202 is shown at E in FIG. 8. This signal may also be used to trigger the analog to digital converter 102 for the next conversion. Analog to digital converter 102 then provides the weight input pulse train on line 104 which is applied to countup terminal 190 of the counter 166, assuming positive weight and in the normal operation mode. During the period of time that analog to digital converter 102 is providing the weight input pulse train, an A/D busy signal is present on line 182. The signal on line 182 is applied as one input to AND gate 204. If a marker input pulse had occurred on line 98, flip-flop 206 would be set. Therefore, the A/D busy signal on ine 182 would cause the resetting of address counter 152. The A/D busy signal on line 182 would also cause flip-flop 206 to be reset after being delayed by delay unit 208. Delay unit 208 insures that address counter 152 is reset before flip-flop 206 is reset. Delay unit 208 may be comprised of any suitable delay unit. The A/D busy signal on line 182 is shown at F in FIG. 8. Trailing edge detector 184 generates a pulse on preset input 186 of storage register 188 as shown at G in FIG. 8. This pulse on preset input 186 causes the contents of counter 166 to be preset or loaded into storage register 188. Physically, storage register 188 may be a part of rate multiplier 29 or computer 88.

In view of the above, it is apparent that numerous variations and modifications may be made to the circuits and structure disclosed herein within the spirit of the teachings of this invention. Various other electronic circuits may be used to carry out the present invention. For example, although the present invention has been disclosed in digital form, an analog memory such as a magnetic tape may be used. For example, in an analog system, the memory may be a magnetic tape having an analog signal corresponding to the variations in weight effects along the belt recorded thereon. In addition, numerous circuit modifications and variations may be made to achieve the same results in essentially the same manner.

In view of the above, the present invention may be embodied in other specific forms without departing from the spirit or essential attributes thereof and, accordingly, reference should be made to the appended claims, rather than to the foregoing specification as indicating the scope of the invention.

I claim:

1. Apparatus for compensating for the effects of the characteristics of a conveyor means at a predetermined measuring point, as the conveyor means traverses said measuring point, comprising:
    means for detecting a predetermined point on said conveyor means;
    means for generating a marker pulse in response to the detection of said point, said marker pulse indicating a complete cycle of movement of said conveyor means;
    means for generating travel pulses in response to movement of said conveyor means, said travel pulses indicating the movement of segments of said conveyor means past said measuring point;
    means for generating a first signal representing said effects when the conveyor means is not loaded;
    means for generating a second signal representing said effects of the conveyor means when it is loaded;
    means for storing said first signal representing said effects of said conveyor means in an address location determined by said marker and travel pulses;
    means for reading out of said storing means said stored signal in response to said marker and travel pulses; and
    means for compensating said second signal by said stored signal 2. Apparatus in accordance with claim 1 wherein said conveyor means is an endless conveyor belt.

3. Apparatus in accordance with claim 1 wherein said predetermined point on said conveyor means is transparent and said means for detecting said predetermined point comprises a photodetector mounted in juxtaposition with said conveyor means and adpated to detect light passing through said transparent point.

4. Apparatus in accordance with claim 1 wherein said means for generating travel pulses comprises a toothed wheel driven by said conveyor means and a magnetic pickup device mounted in juxtaposition to said toothed wheel.

5. Apparatus in accordance with claim 1 wherein said means for detecting the effects of the characteristics of said conveyor means as it traverses said measuring point comprises a load cell for measuring weight.

6. Apparatus in accordance with claim 1 wherein said storing means comprises a digital storage memory having a capacity of at least M words with N bits per word, where M is a number equal to the number of segments into which the conveyor means is to be divided, and N is a number equal to the number of bits of information required for storing the effects of said characteristics of said unloaded conveyor means.

7. Apparatus in accordance with claim 1 wherein said storing means comprises a digital memory having a storage capacity of at least M words with 10 bits per word, wherein M is a number equal to the number of segments into which the conveyor means is to be divided.

8. Apparatus in accordance with claim 1 wherein said means for reading out of said storing means comprises means for addressing said storing means and said means for compensating includes a counter and means for applying the information read out of said storing means to preset said counter to the complement of the effect of said characteristics of a segment of the conveyor means corresponding to the address being addressed by the addressing means.

9. Apparatus in accordance with claim 1 wherein said means for detecting a predetermined point includes:
    means for indicating the position of said point on said conveyor means; and
    a detector mounted in juxtaposition with said conveyor means for cooperation with said indicating means to detect said predetermined point.

10. Apparatus for compensating the weight of a conveyor belt at a weighing point, as the conveyor belt traverses the weighing point, comprising:
    means for detecting a predetermined point on said conveyor belt;
    means for generating a marker pulse in response to the detection of said point, said marker pulse indicating a complete cycle of movement of said conveyor belt;
    means for generating travel pulses in response to movement of said conveyor belt, said travel pulses indicating the movement of segments of said conveyor belt past said weighing point;
    weighing means located at said weighing point for providing a first signal representative of the weight of said conveyor belt measured at the weighing point when the belt is loaded;
    means for providing a second signal representative of the weight of said belt measured at the weighing point when the belt is unloaded;
    means for storing said second signal generated by said weighing means in address locations determined by said marker and travel pulses;
    means for reading out of said storing means said stored signal in response to said marker and travel pulses; and means for algebraically subtracting said stored signal from said first signal.

11. Apparatus in accordance with claim 10 wherein said conveyor belt is an endless belt.

12. Apparatus in accordance with claim 10 wherein said predetermined point on said conveyor belt is transparent and said means for detecting said predetermined point comprises a photodetector mounted in juxtaposition with said conveyor belt and adapted to detect light passing through said transparent point.

13. Apparatus in accordance with claim 10 wherein said means for generating travel pulses comprises a toothed wheel driven by said conveyor belt and a magnetic pickup device mounted in juxtaposition to said toothed wheel.

14. Apparatus in accordance with claim 10 wherein said storing means comprises a digital storage memory having a capacity of at least M words with N bits per word, where M is the number equal to the number of areas into which the conveyor belt is divided, and N is a number equal to the number of bits of information required for storing the weight effects of each segment of the conveyor belt.

15. Apparatus in accordance with claim 10 wherein said storing means comprises a digital memory having a storage capacity of at least M words with 10 bits per word, wherein M is a number equal to the number of segments into which the conveyor belt is to be divided.

16. Apparatus in accordance with claim 10 wherein said means for reading out of said storing means comprises means for addressing said storing means and said means for algebraically subtracting includes a counter and means for applying the information read out of said storing means to preset said counter to the complement of the weight of a segment of the belt corresponding to the address being addressed by the addressing means.

17. A mass flow control system for use with a motor driving an endless conveyor belt having means for feeding material onto the belt and wherein a signal responsive to the speed of the conveyor belt is generated, said system comprising:

means for generating a desired set point signal corresponding to a desired mass flow rate;

means for generating a first signal corresponding to the weight effects of a segment of the conveyor belt passing a predetermined weighing point when the conveyor belt is loaded;

means for generating a second signal corresponding to the effect of a segment of the belt when it is unloaded;

means for storing said second signal;

means for reading out of said storing means said stored signal;

means for subtracting the stored signal from the first signal to provide a net weight signal;

means for multiplying said net weight signal with the signal responsive to the speed of said conveyor belt to provide a mass flow output signal; and means responsive to said set point signal and said mass flow signal for controlling the speed of the motor driving the endless conveyor belt to maintain the mass flow at the desired set point.

* * * * *